Jan. 31, 1939.   R. H. KINGDON   2,145,546
ELECTRIC METER SERVICE APPLIANCE
Filed Sept. 9, 1935   2 Sheets-Sheet 2
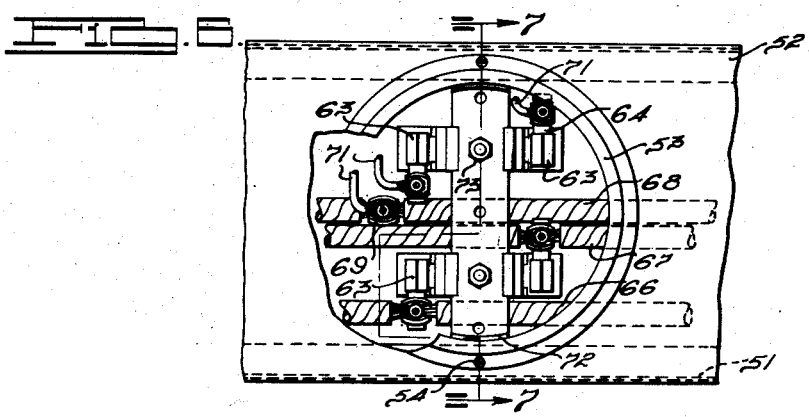
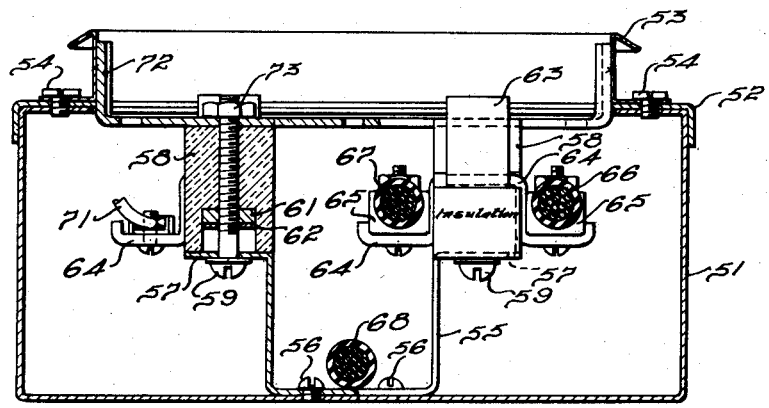
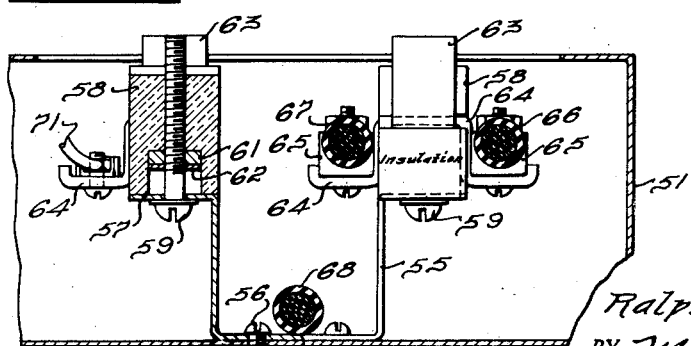
INVENTOR.
Ralph H. Kingdon.
BY Myron J. Seibold
ATTORNEY.

Jan. 31, 1939. R. H. KINGDON 2,145,545
ELECTRIC METER SERVICE APPLIANCE
Filed Sept. 9, 1935 2 Sheets-Sheet 1
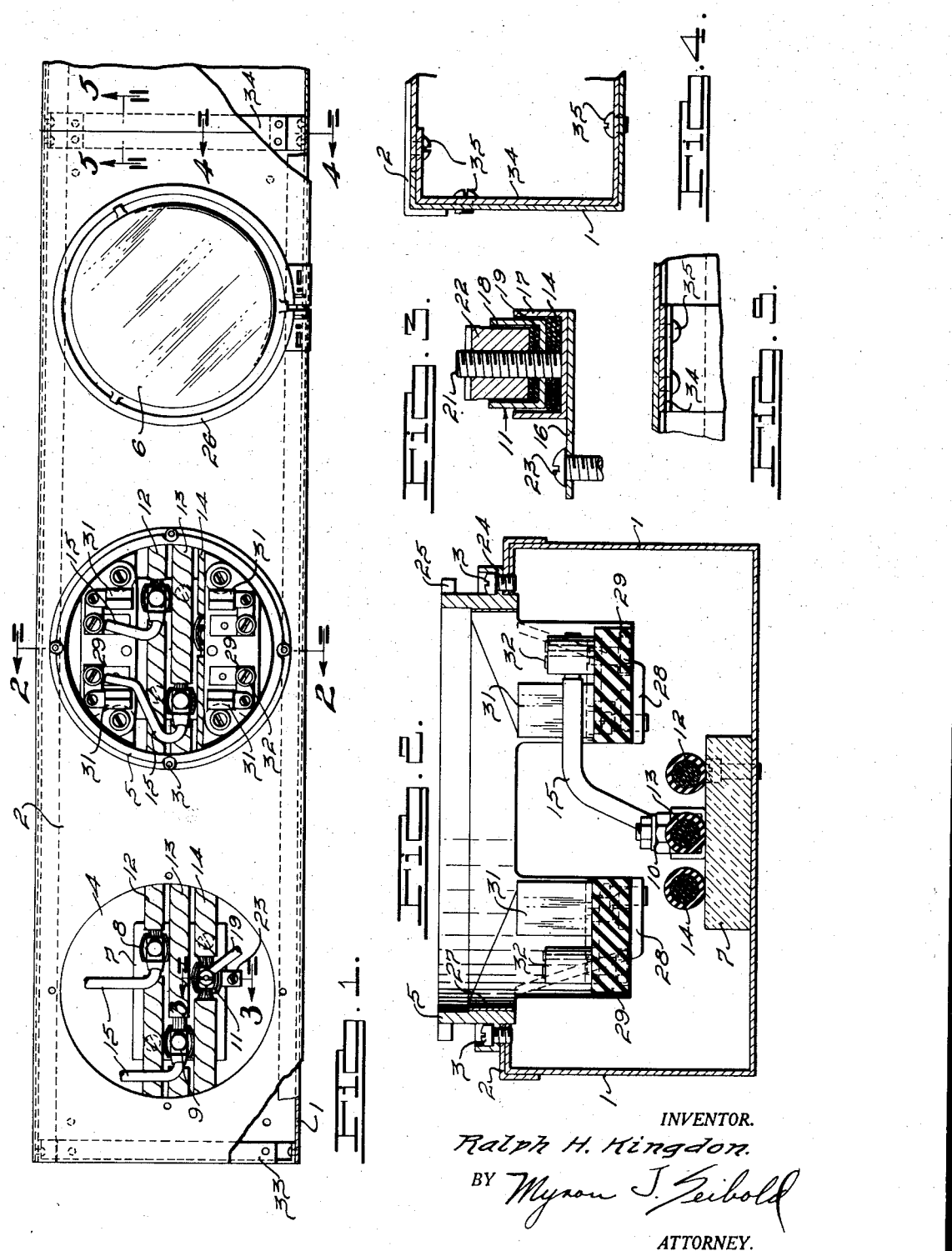
INVENTOR.
Ralph H. Kingdon.
BY Myron J. Seibold
ATTORNEY.

Patented Jan. 31, 1939

2,145,546

UNITED STATES PATENT OFFICE 2,145,546

ELECTRIC METER SERVICE APPLIANCE

Ralph H. Kingdon, Detroit, Mich., assignor to Square D Company, Detroit, Mich., a corporation of Michigan Application September 9, 1935, Serial No. 39,783

9 Claims. (Cl. 247—2)

This invention relates to electric meter service appliances and more particularly to troughs adapted for protective association with electric meters.

One object of this invention is to provide a sheet metal trough having improved means for electrical connection to an associated meter.

Another object of this invention is to provide a sheet metal trough with a plurality of openings adapted to receive meter fittings and with a plurality of insulating blocks spaced in accordance with the meter spacing and carrying connectors receiving buses extending through the trough.

Another object of this invention is to provide a meter service trough having a removable cover with spaced openings therein receiving ring sockets and with interior insulating bases spaced in accordance with the ring openings and carrying connectors receiving buses extending through the trough.

Another object of this invention is a sheet metal trough according to the above objects having open ends closable by end walls or by connection to adjacent similar trough sections.

Another object of this invention is to provide a meter service trough of the socket type with improved mounting for the parts facilitating the wiring thereof.

Another object of this invention is to provide a meter service trough of the socket type wherein the socket ring is removable and the contact carrying blocks are resiliently mounted within the trough to facilitate the locating of the parts.

Other objects and features of the invention will be readily apparent to those skilled in the art from the following specifications and appended drawings illustrating certain preferred embodiments of the invention in which:

Figure 1 is a top plan view of a trough according to the present invention.

Figure 2 is an enlarged sectional view on line II—II of Figure 1.

Figure 3 is an enlarged detail sectional view on line III—III of Figure 1.

Figure 4 is an enlarged detail sectional view on line IV—IV of Figure 1.

Figure 5 is a detail sectional view on line V—V of Figure 2.

Figure 6 is a top plan view of a single socket illustrating a modified form of the invention.

Figure 7 is a sectional view taken on the line VII—VII of Figure 6.

Figure 8 is a view similar to Figure 7 with the cover and associated parts removed.

The meter service appliance illustrated in Figures 1 to 5, inclusive, comprises a rectangular open top sheet metal trough 1 having a cover 2 removably attached thereto by studs 3. The cover 2 is provided with a plurality of spaced circular openings 4 in which are secured ring sockets 5 receiving the meter 6. Figure 1 shows a trough section having three meter openings in which the one at the left is shown without the ring socket, the central opening being shown with the ring socket in place and the opening at the right being shown with the meter in place over the socket. Beneath each of the openings 4 is mounted an insulating base 7 carrying connectors 8, 9 and 11 in position to engage the line buses 12, 13 and 14. The connectors 8 and 9 are also adapted to secure the lugs 10 on the ends of flexible wires 15 leading to the line side of the meter ring socket. Connector 11 which receives the neutral bus is shown in detail in Figure 3 and comprises a conducting strap 16 upon which is seated the open ended cup shaped member 17 receiving the strands from the neutral line bus 14. A similar but smaller cup shaped member 18 is received within the member 17 and in turn receives the strands of the neutral load wire 19 which is led to the exterior of the trough. A securing stud 21 extends through the elements 16, 17 and 18 and carries a nut 22 adapted to be tightened down to securely grip the conductors and hold them in position. A stud 23 electrically connects the strap 16 to the trough and serves as a grounding connection.

Four threaded screw holes are shown spaced at the top, bottom and sides of the openings 4 and serve to secure the ring 5 to the trough cover. The top and bottom holes, in addition, secure the cover to the trough as shown in Figure 2.

The ring socket 5 has a lower flange 24 adapted to be secured against the trough cover and an upper flange 25 which abuts against a similar flange on the meter in position to receive a sealing ring 26 to seal the meter in position. This ring serves to obscure the screws attaching the ring and the cover to the trough and hence seals the assembly against unauthorized tampering. The ring 5 has suitable interior insulation 27 and depending portions 28 carrying insulating blocks 29 on which are mounted four jaws 31 in position to receive terminal blades on the meter. These jaws have electrical connection to the binding posts 32. The wires 15 are connected to the line binding posts as shown in the central opening of Figure 1 and in Figure 2. The load wires are adapted to be secured to the other two binding posts and together with the neutral conductor 19 to be led from the trough through one of a number of spaced knockouts disposed in a side wall of the trough.

The trough sections have open ends and have securing holes by means of which there may be attached to the ends either a closing end wall 33 or a strap 34 for connecting the end of the section to the end of a similar section. This connection is more particularly shown in detail in Figures 4 and 5 which show the strap 34 conforming to the interior shape of the trough and secured to both the sections by means of studs 35.

Applicant's meter service trough arrangement provides a very convenient and inexpensive means of attachment for the gang type of meter arrangement. In installing, the cover 2 may be removed and the line buses 12, 13 and 14 drawn into the trough and connections easily made to the connectors 8, 9 and 11. The wires 15 are then attached to the connectors whereupon the cover 2 may be put in place and the ring sockets 5 secured in position. The connection of the wires 15 to the binding posts 32 and the connection of the load wires to the load binding posts is a very simple and easily executed operation. The meter 6 may then be pushed into position with its blade terminals received in the jaws 31 and the sealing ring 26 attached, whereupon the unit is complete.

The connectors which receive the line buses may be of the form more specifically described in the copending application of John G. Jackson and Wallace T. Allen, Serial No. 712,068, filed February 19, 1934.

A modified construction is illustrated in Figures 6 to 8, inclusive. The structure there shown comprises a trough 51 having a cover 52. A sheet metal ring 53 is secured to the cover 52 as by welding. Bolts 54 serve to secure the cover 52 to the trough. On the back of the trough is mounted a flexible or resilient U-shaped support 55 by means of bolts 56. The legs of the U are bent over to form the supporting flanges 57 upon which are mounted the insulating blocks 58 by means of bolts 59 threaded into washers 61 maintained in the blocks 58 by means of washers 62 which are pressed into position. Jaws 63 and conductors 64 are rigidly secured adjacent the opposite ends of each of these blocks. The conductors 64 are adapted to receive the solderless connectors 65 similar to those described in the preceding modification. The line buses 66 and 67 are received within the two connectors 65 upon one of the insulating blocks. The neutral line bus 68 is received in a connector 69 mounted directly on the back of the trough. The connector 69 may be of double type illustrated in Figure 3 in order to receive the neutral load wire leading from the trough. Within the connectors 65 on the ends of the other insulating block are received the branch circuit wires 71.

A strap 72 is rigidly secured to the ring 53 as by welding and is provided with openings receiving the ends of the bolts 59 whereupon the nuts 73 serve to draw the strap 72, the insulating block 58 and the supporting flange 57 tightly together.

The connection just described is adapted to receive the meter and sealing ring in the same manner as described in the embodiment illustrated in Figures 1 to 5, inclusive. This ring serves to seal the bolts 54 in the same manner as previously described.

In wiring the trough of this embodiment, the bolts 54 and nuts 73 are removed whereupon the cover 52 carrying the ring 53 and the strap 72 is removed leaving the parts as shown in Figure 8. The line buses 66, 67 and 68 and the load wires 71 are then laid or drawn into the trough and joined to their appropriate connectors, whereupon the cover may be placed back on the trough with the bolts 59 received in the appropriate openings in the strap 72 and the nuts 73 tightened to join the parts together. It is to be noted that the strap 72 and the insulating blocks 58 are provided with interengaging guiding flanges and grooves to properly allocate the parts and that the flanges 57 are also received in appropriate grooves in the bottom of the blocks 58 to locate them thereon.

The supporting strap 55 is formed of at least slightly resilient material to allow discrepancies in manufacture and assembly and to permit the bolts 59 and blocks 58 to be properly located with respect to the strap 72.

While in the modification illustrated in Figures 6 to 8, inclusive, only a single meter socket opening has been shown, it is to be understood that the device in the form therein illustrated is to have its complete form as shown in Figure 1, utilizing any number of openings and any length of trough or any number of trough sections.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. An electric meter service appliance comprising a rectangular sheet metal trough, removable cover means for said trough provided with a plurality of openings spaced in accordance with a desired meter spacing, a meter socket in each opening, said sockets carrying contact jaws adapted to cooperate with meter terminal blades, an insulating base mounted on the bottom of the trough substantially beneath each socket, connectors mounted on said bases and engaging buses extending through the trough, and means interconnecting certain of said connectors and jaws.

2. An electric meter service appliance comprising a rectangular sheet metal trough, removable cover means for said trough provided with a plurality of openings spaced in accordance with a desired meter spacing, a meter socket in each opening, said sockets carrying contact jaws adapted to cooperate with meter terminal blades, an insulating base mounted on the bottom of the trough substantially beneath each socket, connectors mounted on said bases and engaging buses extending through the trough and means interconnecting certain of said connectors and jaws.

3. An electric meter service appliance comprising a sheet metal trough having a cover with an opening therein, a ring formation on said cover about said opening and adapted for the protective association therewith of an electric meter, a relatively rigid metal strip bridging said ring, a pair of insulating bases supported on said trough beneath said opening independently of said strip, said mountings being relatively resilient, means for locating said bases relative to said strip and means for releasably securing said bases to said strip when said cover is in place.

4. An electric meter service appliance comprising a sheet metal trough, one wall of said trough having an opening, a ring formation on said wall about said opening and adapted for the protective association therewith of an electric meter, a relatively rigid strip bridging said ring, a pair of insulating bases supported by said trough independently of said strip adjacent to said opening and carrying contact jaws and wire connectors, and means for releasably securing said strip to said bases.

5. An electric meter service appliance comprising a sheet metal trough having a removable cover with an opening therein, a ring formation on said cover about said opening and adapted for the protective association therewith of an electric meter, a relatively rigid metal strip bridging said ring, a resilient support mounted on the back of the trough, and insulating blocks on said support carrying contact jaws and wire connector terminals, said blocks being adapted to be rigidly secured to said strip when said cover is in place.

6. An electric meter service appliance comprising a sheet metal trough, a removable cover for said trough having an opening therein, a ring formation on said cover about said opening and adapted for the protective association therewith of an electric meter, a relatively rigid metal strip bridging said ring, a resilient U-shaped member mounted on the back of the trough and having mounting flanges on the free ends of its legs, studs extending through said flanges and securing insulating blocks thereagainst, said blocks carrying contact jaws and wiring connectors, said studs extending through said strip, and nuts on said studs rigidly securing said strip to said blocks.

7. An electric meter service appliance comprising a sheet metal trough, a cover for said trough having a plurality of openings therein, ring formations on said cover about the openings and adapted for the protective association therewith of electric meters, relatively rigid strips bridging said rings, a pair of insulating bases supported by said trough adjacent to each of said openings and carrying contact jaws and wire connectors, and means for rigidly but releasably securing each of said strips to its associated pair of bases when said cover is in place.

8. An electric meter service appliance comprising a rectangular sheet metal trough having a width substantially approximating the width of a meter to be associated therewith and having a length sufficient to accommodate a plurality of meters, cover means for said trough providing a plurality of openings spaced longitudinally of the trough in accordance with a desired meter spacing, a socket ring rigidly mounted on said cover means about each of said openings, said sockets being adapted to receive the meters in supporting relation, an insulating base supported on the bottom of the trough beneath each of the sockets, and connectors mounted on said bases in position to be engaged by buses extending through the trough, said cover means and sockets being readily removable from the trough without disturbing the bases and the connections of the busses in said connectors within the trough.

9. An electric meter service appliance comprising an enclosure having a removable cover, a ring socket rigidly mounted on said cover about an opening therein and adapted to have an electric meter clamped thereon in supported relation, said ring socket including insulating formations carrying contact jaws adapted to receive terminal blades on said meter, an insulating base mounted in said enclosure, connectors on said base for the reception of circuit conductors, and means connecting at least certain of said base connectors to at least certain of said contact jaws, said means being readily releasable to permit removal of the cover and ring socket without disturbing the base and the connection of said circuit conductors in said connectors within the enclosure.

RALPH H. KINGDON.